(12) United States Patent
Coulter

(10) Patent No.: US 11,554,533 B2
(45) Date of Patent: Jan. 17, 2023

(54) ADDITIVE MANUFACTURING SYSTEM WITH TUNABLE MATERIAL PROPERTIES

(71) Applicant: Lehigh University, Bethlehem, PA (US)

(72) Inventor: John P. Coulter, Bethlehem, PA (US)

(73) Assignee: Lehigh University

( * ) Notice: Subject to any disclaimer, the term of this patent is extended or adjusted under 35 U.S.C. 154(b) by 282 days.

(21) Appl. No.: 16/610,666

(22) PCT Filed: May 4, 2018

(86) PCT No.: PCT/US2018/031184
§ 371 (c)(1),
(2) Date: Nov. 4, 2019

(87) PCT Pub. No.: WO2018/204844
PCT Pub. Date: Nov. 8, 2018

(65) Prior Publication Data
US 2020/0147863 A1 May 14, 2020

Related U.S. Application Data

(60) Provisional application No. 62/501,421, filed on May 4, 2017.

(51) Int. Cl.
| B29C 64/118 | (2017.01) |
| B29C 64/321 | (2017.01) |
| B29C 64/364 | (2017.01) |
| B29C 64/245 | (2017.01) |
| B29C 64/295 | (2017.01) |

(Continued)

(52) U.S. Cl.
CPC .......... *B29C 64/118* (2017.08); *B29C 64/209* (2017.08); *B29C 64/241* (2017.08); *B29C 64/245* (2017.08); *B29C 64/295* (2017.08); *B29C 64/321* (2017.08); *B29C 64/364* (2017.08); *B33Y 10/00* (2014.12); *B33Y 30/00* (2014.12); *B33Y 40/00* (2014.12)

(58) Field of Classification Search
CPC ... B29C 64/209; B29C 64/241; B29C 64/321; B29C 64/245; B29C 64/118; B29C 64/106
See application file for complete search history.

(56) References Cited

U.S. PATENT DOCUMENTS

| 5,975,493 A | 11/1999 | Ellingson |
| 2014/0291886 A1 | 10/2014 | Mark et al. |

(Continued)

FOREIGN PATENT DOCUMENTS

| EP | 1286822 | 3/2003 |
| EP | 1286822 A1 | 3/2003 |

(Continued)

OTHER PUBLICATIONS

European Supplemental Search Report from European Application No. 18793828 dated Dec. 21, 2020.

(Continued)

*Primary Examiner* — Joseph S Del Sole
*Assistant Examiner* — Mohamed K Ahmed Ali
(74) *Attorney, Agent, or Firm* — The Belles Group, P.C.

(57) ABSTRACT

Described herein are additive manufacturing systems and methods for printing 3D objects.

18 Claims, 8 Drawing Sheets

(51) Int. Cl.
    *B29C 64/209*     (2017.01)
    *B29C 64/241*     (2017.01)
    *B33Y 10/00*     (2015.01)
    *B33Y 30/00*     (2015.01)
    *B33Y 40/00*     (2020.01)

(56) References Cited

U.S. PATENT DOCUMENTS

| | | |
|---|---|---|
| 2016/0151982 A1 | 6/2016 | Sand |
| 2016/0288395 A1 | 10/2016 | Shen et al. |
| 2017/0120513 A1* | 5/2017 | Brennan ................. B29B 7/404 |
| 2017/0217088 A1 | 8/2017 | Boyd, IV et al. |
| 2017/0291841 A1 | 10/2017 | Inamura et al. |
| 2018/0056584 A1 | 3/2018 | Wittner |
| 2018/0078677 A1 | 3/2018 | Cho et al. |
| 2018/0370117 A1* | 12/2018 | Gardiner ................ B29C 64/241 |
| 2019/0009468 A1* | 1/2019 | Feeney ................. B29C 64/364 |
| 2020/0361149 A1* | 11/2020 | Arao ...................... B33Y 10/00 |

FOREIGN PATENT DOCUMENTS

| | | |
|---|---|---|
| EP | 3117982 | 1/2017 |
| WO | 0189814 A1 | 11/2001 |
| WO | WO2016153179 A1 | 9/2016 |
| WO | WO2017018985 A1 | 2/2017 |

OTHER PUBLICATIONS

International Search Report issued for PCT/US2018/31184, dated Aug. 8, 2018, pp. 1-4.

* cited by examiner

ADDITIVE MANUFACTURING SYSTEM WITH TUNABLE MATERIAL PROPERTIES

CROSS-REFERENCE TO RELATED APPLICATION

The present application claims priority to U.S. provisional application No. 62/501,421, filed May 4, 2017, the entire disclosure of which is incorporated herein by reference.

FIELD OF THE DISCLOSURE

The present invention relates to an additive manufacturing system and method for tuning and customizing the material properties of a printed 3D object.

BACKGROUND

Conventional additive manufacturing processes typically print 3D objects by depositing layers of material one on top of the other on a build stage until the final printed object is formed. Fused deposition and micro-precision extrusion are additive manufacturing processes that create 3D product architectures by depositing molten polymer strands in desired layered patterns to create the target object. Examples of conventional additive manufacturing processes are disclosed in U.S. Published Application No. 2018/0056584 to Wittner and U.S. Published Application No. 2017/0217088 to Boyd, I V et al., the subject matter of both of which is herein incorporated by reference.

Such conventional processes, however, do not allow for customization of the material properties of the final printed object, which limits applications of the final object. For example, due to the inherent layering technique used in conventional additive manufacturing, the strength of the fabricated products is typically inferior to those manufactured via injection molding.

Therefore, a need exists for an additive manufacturing system and method that produces printed 3D objects with highly customizable material properties.

SUMMARY

The present invention may provide an additive manufacturing system for printing a 3D object that comprises a feeder configured to accept and feed an object material through the additive manufacturing system, where the object material is the material of the 3D object to be printed, a heater or heaters in communication with the feeder, and the heaters are configured to receive the object material from the feeder for controlled heating of the object material as the object material passes through the additive manufacturing system, and a nozzle configured to receive the object material from the heaters and through which the object material is extruded for depositing the object material onto a build stage. The system also comprises a shear rate tuning mechanism configured for controlling a shear rate imposed on the object material in one or more directions as the object material passes through the additive manufacturing system, a temperature control mechanism for tuning the melt temperature and solidification of the object material throughout the additive manufacturing system, and a control or controls for operating the shear rate tuning mechanism and the temperature control mechanism in order to impact the localized evolution and final state of molecular orientation throughout the printed 3D object.

In certain embodiments, the control or controls are configured to operate the shear rate tuning mechanism and the temperature control mechanism in order to impact the localized evolution and final state of the crystallinity throughout the printed 3D object; the object material includes filler components and the control or controls are configured to operate the shear rate tuning mechanism and the temperature control mechanism in order to impact the localized evolution and final state of filler distribution and alignment throughout the printed 3D object; the temperature control mechanism includes a heating or cooling device to control the temperature of either a build surface of the build stage or an ambient environment around the object material; the shear rate tuning mechanism includes an adjustable channel in communication with the nozzle, the channel defines a gap through which the object material flows, and the control or controls selects the size of the gap in order to tune the shear rate imposed on the object material as it passes through the channel; the adjustable channel includes movable segments movable by the control or controls to the selected gap size; the movable segments are movable laterally toward and away from each other to decrease or increase, respectively, a cross-sectional dimension of the channel; and/or the movable segments are movable longitudinally toward and away from the nozzle to increase or decrease, respectively, a cross-sectional dimension of the channel.

In other embodiments, the shear rate tuning mechanism includes an adjustable rotation device of the feeder, and the control or controls selects a rate of rotation of the adjustable rotation device to increase or decrease the speed of flow of the object material from the feeder and through the additive manufacturing system, thereby tuning the shear rate to which the object material is exposed; the build stage is movable and the control or controls are configured to move the build stage in concert with the selected rate of rotation; the adjustable rotation device includes a set of rotating rollers between which the object material is fed to the heater or heaters; the control or controls adjusts the rate of rotation of the set of rotating rollers to increase or decrease the flow speed of the object material and the shear rate imposed on the object material; the adjustable rotation device includes a rotatable screw extruder that feeds the object material to the heater and the nozzle; the control or controls adjusts the rate of rotation of the rotatable screw extruder to increase or decrease the flow speed of the object material and the shear rate imposed on the object material; the shear rate control mechanism includes the nozzle which rotates about a longitudinal axis thereof to impose a controlled amount of shear in a circumferential direction on the object material; the control or controls selects a rate of rotation of the rotatable nozzle to tune the shear rate imposed on the object material; the object material is a polymer, polymer composite, or a polymer with filler; the temperature control mechanism includes a temperature bed associated with the build stage; and/or the temperature bed includes one or more blowers for heating or cooling the object material extruded from the nozzle on the build stage.

The present invention may also provide an additive manufacturing system for printing a 3D object that comprises a feeder configured to accept and feed an object material through the additive manufacturing system, a heater or heaters in communication with the feeder, and the heaters are configured to receive the object material from the feeder for controlled heating of the object material as the object material passes through the additive manufacturing system, and a nozzle configured to receive the object material from the heaters and through which the object material is extruded for depositing the object material onto a build stage. The system further comprises a means for imposing shear on the object material and the means is configured to tune a shear rate imposed on the object material in one or more directions as the object material passes through the additive manufacturing system, a means for controlling a temperature of the system for tuning the crystallinity of the object material, and control means for operating the means for imposing shear on the object material and the means for controlling a temperature of the system in order to impact the localized evolution and final state of one or both of molecular orientation and/or crystallization throughout the printed 3D object.

In some embodiments, the control means includes a means for adjusting the means for imposing shear on the object material to increase or decrease the shear rate imposed on the object material; and or the means for imposing shear on the object material includes one of means for adjusting a rate of flow of the object material or a means for adjusting a size of a gap through which the object material flows, or both the means for adjusting the rate of flow of the object material and the means for adjusting the size of the gap.

In one embodiment, the means for adjusting the rate of flow of the object material includes a feeder having a set of rollers with adjustable rotation, or the nozzle with adjustable rotation, or both the set of rollers with adjustable rotation and the rotatable nozzle; and the means for adjusting the size of the gap includes an adjustable channel in communication with the nozzle, the channel defines the gap through which the object material flows, and the control selects the size of the gap in order to tune the shear rate imposed on the object material. In another embodiment, the means for controlling the temperature of the system includes a heating or cooling device to control the temperature of either a build surface of the build stage or an ambient environment around the object material.

The present invention may yet further provide a method of additive manufacturing for printing a 3D object, comprising the steps of feeding an object material to a heater or heaters, the object material being the material of the 3D object to be printed; heating the object material after the step of feeding the object material; extruding the object material to a build stage for printing the 3D object after the step of heating the object material; and controlling a shear rate imposed on the object material in one or more directions, thereby tuning the shear rate imposed on the object material and controlling the temperature of the object material, thereby tuning the solidification the extruded object material to impact the localized evolution and final state of molecular orientation throughout the printed 3D object.

In an embodiment, the method further comprises the step of freezing the final state of molecular orientation into the printed 3D object. In certain embodiments, the step of controlling the temperature includes heating or cooling the object material either while extruding the object material or after extruding the object material; and/or the method further comprises the step of setting the object material after the step of extruding the object material to the build stage. In another embodiment, the step of controlling the shear rate of the object material includes adjusting a rate of flow of the object material or adjusting a size of a gap through which the object material flows to be extruded, or both adjusting the rate of flow of the object material and adjusting the size of the gap.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
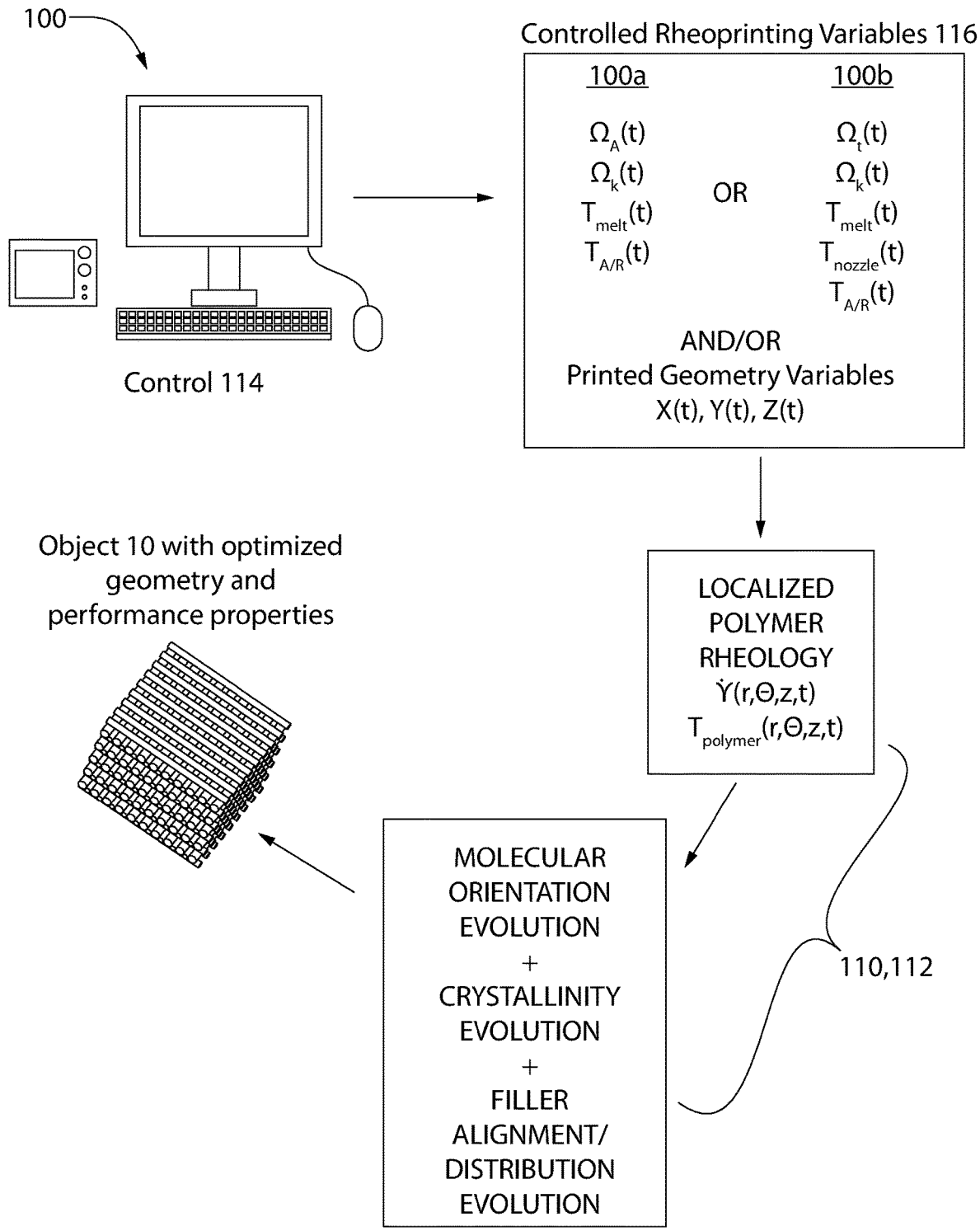
FIG. 1 is a schematic view of an exemplary additive manufacturing system and method according to the present invention.
Figure 2:
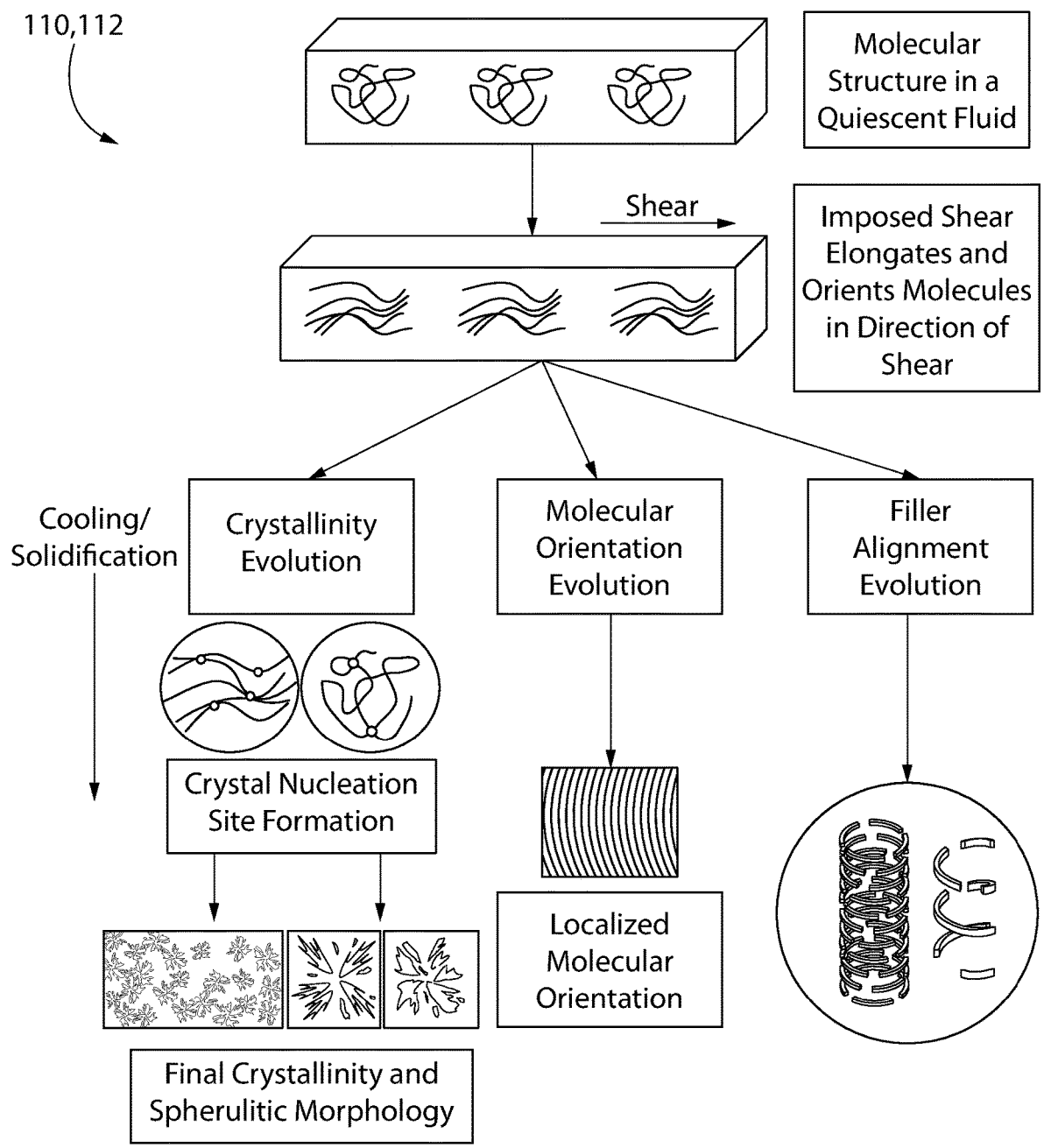
FIG. 2 is schematic view of tunable shear rate and temperature control mechanisms of the system of the present invention.

Referring to FIGS. 1 and 2, the present invention relates to an improved additive manufacturing system 100 and related method that incorporates material property control to enable additive manufacture of a product or object 10 with tunable material properties for optimized performance in a wide range of applications. For example, the system 100 of the present invention enhances the process of target precision in replicating geometry of a CAD-based model by adding the control of the manufactured product's material properties. By controlling the molecular orientation of the object's material in one or more directions and the crystallinity thereof, the strength of the object can be anisotropically enhanced. Through this enhancement, materials, such as recycled polymers, may also be enhanced approaching that of first-generation polymers processed via conventional 3D printing processes. The system 100 is particularly beneficial for customizing objects that are polymers or polymer based, such as polymer composites or polymers with fillers. However, the system 100 may also be used for other materials of the object, such as metals, ceramics, biomaterials, and the like.

The parameters of the object (to be printed) that can be controlled according to the present invention may include, for example, melt rheology, printed product molecular orientation, crystalline morphology, and/or crystallization kinetics, as seen in FIG. 2. Development and refinement of the system and process 100 of the present invention is accomplished through incorporation of physical and process control elements that enable optimal tuning of melt-dynamics and temperature throughout the printing process, as seen in FIGS. 1 and 2. These process control elements add control over resulting temporal pressures, temperatures, and strain rates that in turn directly impact molecular orientation evolution, relaxation dynamics, and crystallization kinetics of the object material during processing. The present invention may also provide customization of the object material (e.g. a polymer) deposition melt flow rate, such that the printing speed can be maintained without effecting the deposited polymer's dimensional parameters.

The additive manufacturing system and process 100 of the present invention allows accurate customization of material properties, such as properties of a polymer, at the molecular level by imposing shear and temperature on the material during the printing process. For precision beyond the typical target 3D geometry of polymer products, the present invention enables tunability in polymer crystallinity, molecular orientation, and mechanical property at spatially precise locations of the product. The additive manufacturing system and process 100 of the present invention also enables 3D printing of objects made of the same material and having the same geometry, yet having varying customizable properties. For example, the system 100 of the present invention may produce a scaffold with tunable molecular orientation that can be used to direct the direction that biodegradation propagates, or plastic parts that can be designed to have higher anisotropic strength based on application, or parts made of the same material tuned to have different optical or thermal properties; or manufacturing of parts that can be done at consistently high rates of printing, irrespective of the dimensions of the printed "road".

Figures 3A, 3B:
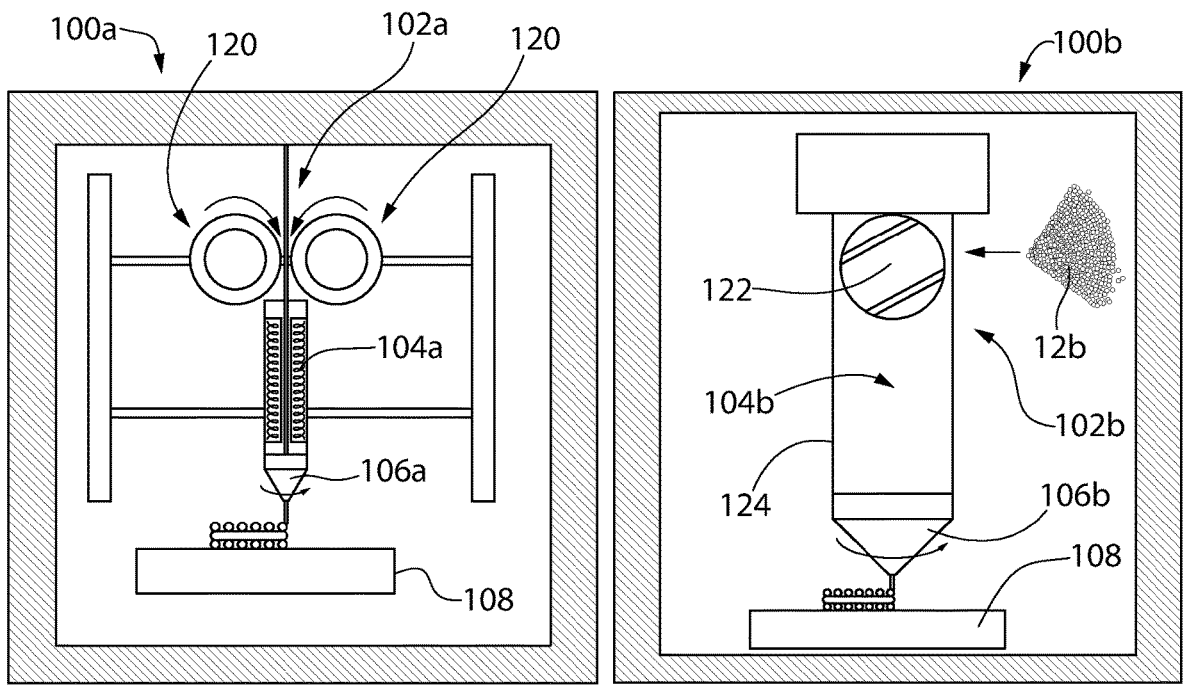
FIG. 3A is an elevational view of an exemplary additive manufacturing system according to the present invention, showing a fused deposition system with tunable material properties capability.
FIG. 3B is an elevational view of another exemplary additive manufacturing system according to the present invention, showing a micro-precision extrusion system with tunable material properties capability.

FIGS. 3A and 3B illustrate exemplary embodiments of the additive manufacturing system 100 of the present invention. FIG. 3A is a fused deposition additive manufacturing system and process 100a and FIG. 3B is a micro-precision extrusion manufacturing system and process 100b that both incorporate the material property control of the present invention. In general, each system 100a, 100b, comprises a feeder 102a, 102b, a heater or heaters 104a, 104b in communication with the feeder 102a, 102b, and a rotatable nozzle 106a, 106b for extruding the material of the object to be printed onto a build stage 108.

The additive manufacturing systems 100a, 100b incorporate process control elements, preferably including a shear rate tuning mechanism 110 and a temperature control mechanism 112, that impose controlled variables 116 on the object material in order to tune or customize the material properties thereof. The controlled variables 116 may include shear (Ω) and temperatures (T) variables, as seen in FIG. 1. One or more controls 114 may operate and adjust the shear rate tuning mechanism 110 and the temperature control mechanism 112 in order to impact the localized evolution and final state of molecular orientation throughout the printed 3D object. The shear rate tuning mechanism 110 and the temperature control mechanism 112 of the present invention are designed to provide precise and temporal shear rate and temperature control so as to proactively impact the localized evolution and final state of molecular orientation throughout the resultant additively manufactured product. The shear rate tuning mechanism 110 and the temperature control mechanism 112 of the system 100a, 100b may be adjusted in real-time via control 114 (FIG. 1), thereby having a direct influence on the shear rate imposed on the object material, thermal history and the ambient temperature to which the object material is exposed. These elements add control over resulting material rheological properties, temporal pressures, temperatures, and strain rates that in turn directly impact molecular orientation evolution, relaxation dynamics, crystalline morphology and crystallization kinetics during processing.

Figure 6:
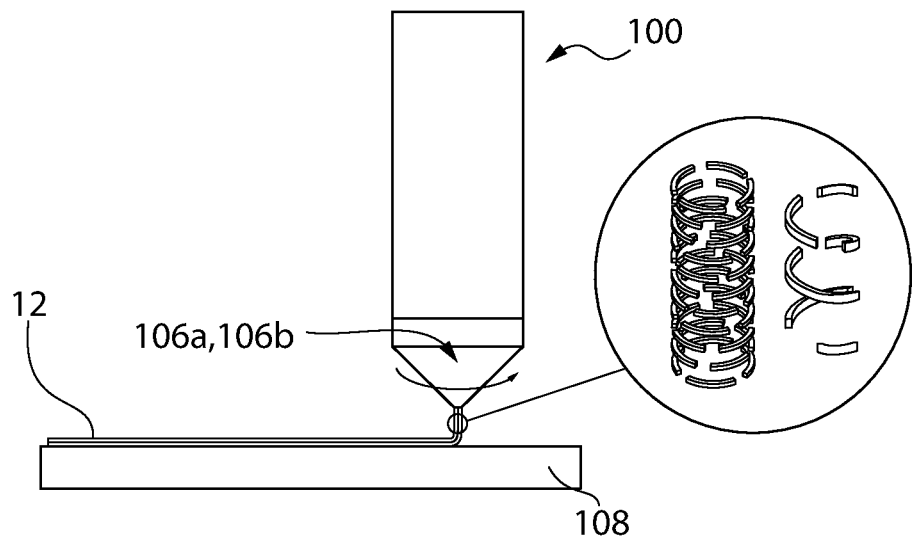
FIG. 6 is an exemplary molecular orientation mechanism of the systems illustrated in FIGS. 3A and 3B.

It is well known that shear dictates the distribution and alignment of fillers or fibers embedded in a host material, like a polymer. In a channel, fibers of the material get aligned in the flow direction near the walls of the channel due to the higher shear while they aligned perpendicular to the flow in the middle of the channel. Using system 100, the fibers can be aligned in different directions. Fibers can be aligned in the axial direction by tuning the printing speed, or it could be aligned in the circumferential direction by rotating the nozzle 106a, 106b. The nozzle 106a, 106b can rotate at different RPMs relative to the speed at which the material is delivered, e.g. by the feeder 102a, 102b, to align fibers in a helical shape and to create helical sweep with various pitch values, as seen in FIG. 6.

Studies performed on different thermoplastic materials have shown that imposing shear rate can orient the macromolecules chains which enhances the crystallization kinetics and crystal structure of semi crystalline polymers; thus, polymeric products properties, such as mechanical, physical, and biodegradation properties will be influenced. High shear rate has shown to influence crystallizations by enhancing the nucleation and the growth rate while very low shear rate has shown no effect on kinetics. High shear rate for a short time can affect the degree of crystal orientation more than lower shear rate imposed over a longer time.

Figure 4:
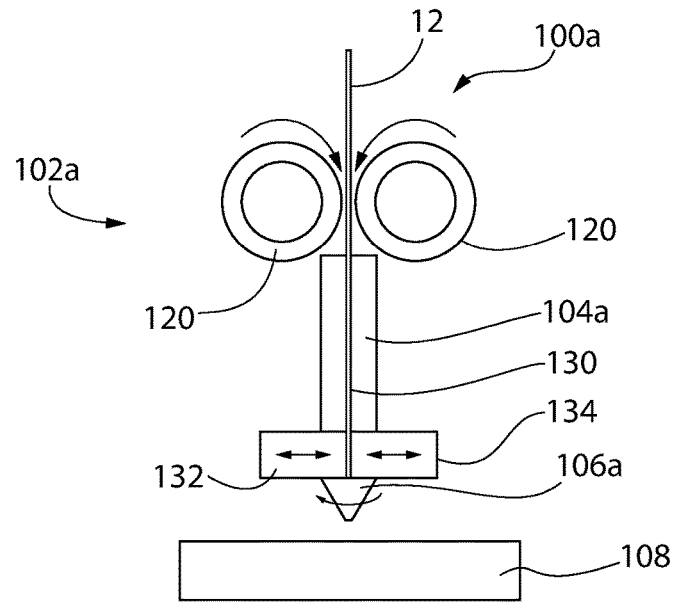
FIG. 4 is an elevational view of the system illustrated in FIG. 3A, showing a molecular orientation mechanism according to an exemplary embodiment of the present invention.

In the fused deposition system 100a shown in FIG. 3A, the object material, preferably a polymer, may be in the form of a solid filament or filaments 12a (FIG. 4), drawn from a spool and into the melting chamber of the heater or heaters 104a by a set of rollers 120 of the feeder 102a for controlled heating of the material. The material then melts as it passes through the chamber of the heater 104a and flows out through the nozzle 106a to be printed into the desired object. The appropriately timed precise x-y-z movement of either the deposition head of the nozzle 106a or the build stage 108 below it allows for the formation of the desired 3D product architecture.

In the fused deposition system 100a, the shear rate tuning mechanism 110 may impose the evolution of the molecular orientation on the object material in one or more directions. For example, to optimize the axial molecular orientation in the deposited polymer strands of the object, the shear rate tuning mechanism 110 may include an adjustable rotation device that may be the rollers 120 and the controlled rotation rate of the rollers 120, that is increasing or decreasing the rotation rate thereof, and/or the temporally adjustable rotation rate of the rollers 120, such that the rollers 120 pull the object material into the heater melting chamber at a controlled speed and drive the process. The shear rate tuning mechanism 110 may also include appropriately configuring the deposition nozzle 106a. The system 100 of the present invention may add real-time control of varying the nozzle diameter to customize diameter of processed polymer strands, and add variation to the shear rate imposed on the extrusion, which in turn adds range to crystallinity and molecular orientation of the final product. This control over axial melt flow dynamics, when coupled with precise but obviously less temporal control over the melt, nozzle region, deposition stage, and chamber temperatures, will determine the shear rate and temperature distribution throughout the polymer material and thus the evolution of axial molecular orientation.

The shear rate tuning mechanism 110 may further include, either alone or in addition to the controlled rotation of the rollers 120, an adjustable channel 130 of the system 100a that defines a gap through which the object material flows. The channel 130 is in communication with the nozzle 106a and may be adjusted by movable segments 132 and 134. Movable segments 132 and 134 are controlled by the control to move laterally toward and away from one another to decrease or increase the cross-sectional dimension of the channel 130, as desired, to tune the shear rate imposed on the object material, where the shear rate increases as the size of the channel 130 decreases to impart axial molecular orientation.

The shear rate tuning mechanism 110 may include the rotatable nozzle 106a of the system 100a, the control of the rotation rate of the nozzle 106a (i.e. increasing or decreasing), and the temporally adjustable rotation rate of the nozzle 106a, to impart circumferential molecular orientation on the object material, preferably before the polymer strand is deposited on the build stage 108. The rotating nozzle 106b is configured to induce circumferential stretching to affect resultant molecular orientation levels in that direction in the object material.

The x-y-z movement of the build stage 108 may be controlled to act in concert with the rate of rotation of the rollers 120 of system 100a or the extrusion screw 122 of system 100b, to optimize the geometry and material properties of the printed object. The rate of rotation of the rollers 120 of system 100a or the extrusion screw 122 will dictate the flow speed of the object material through the system and nozzle. As such, if the speed of the flow of the object material is increased or decreased (due to a change in the rotation rate of the rollers 120 or screw 122) and the movement of the build stage 108 remains unchanged, then the moving build stage 108 will either bunch or stretch the object material roads being extruded from the nozzle (which defines the diameter of each road) and deposited onto the build stage, possibly resulting in flawed geometry and undesired material properties of the printed object. To compensate for that, the system 100 of the present invention may control the x-y-z movement of the build stage 108 movement commensurate with the desired flow speed of the object material. Alternatively, the movement of the build stage 108 may be fixed and the x-y-z movement of the nozzle 106a, 106b may be controlled in the same manner to correspond to the rate of rotation of the rollers 120 and or screw 124.

To maintain the common geometrical assumption that the deposited polymer roads of the object material are of constant diameter, it is understood that the temporal tuning of axial flow rate of the present invention should correspond to an associated temporal modification of the x-y printer stage motion speed or of the x-y motion speed of the nozzle. However, in the system 100 of the present invention, the diameter of the polymer roads of the object material can be set and maintained, such as via control of the rotational speed of the rotating nozzle 106a, 106b. In this way, the x-y speed can be maintained at an optimal speed such that production rate is not slowed down.

Figure 7:
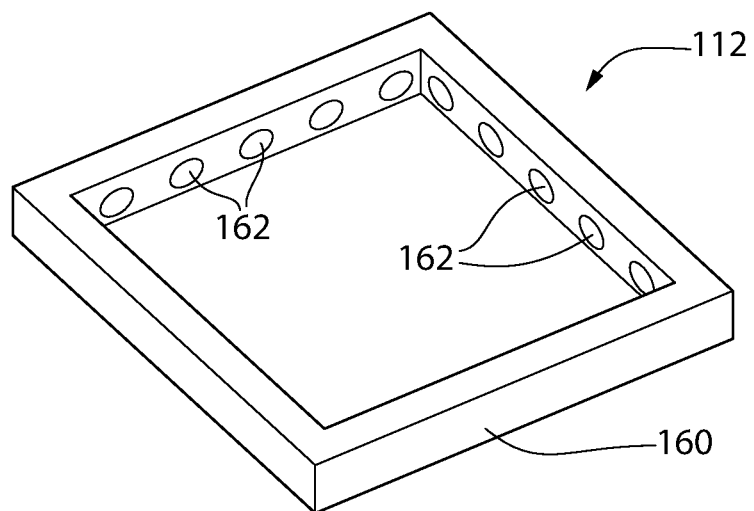
FIG. 7 is an exemplary adjustable temperature mechanism of the systems illustrated in FIGS. 3A and 3B.
Figure 8:
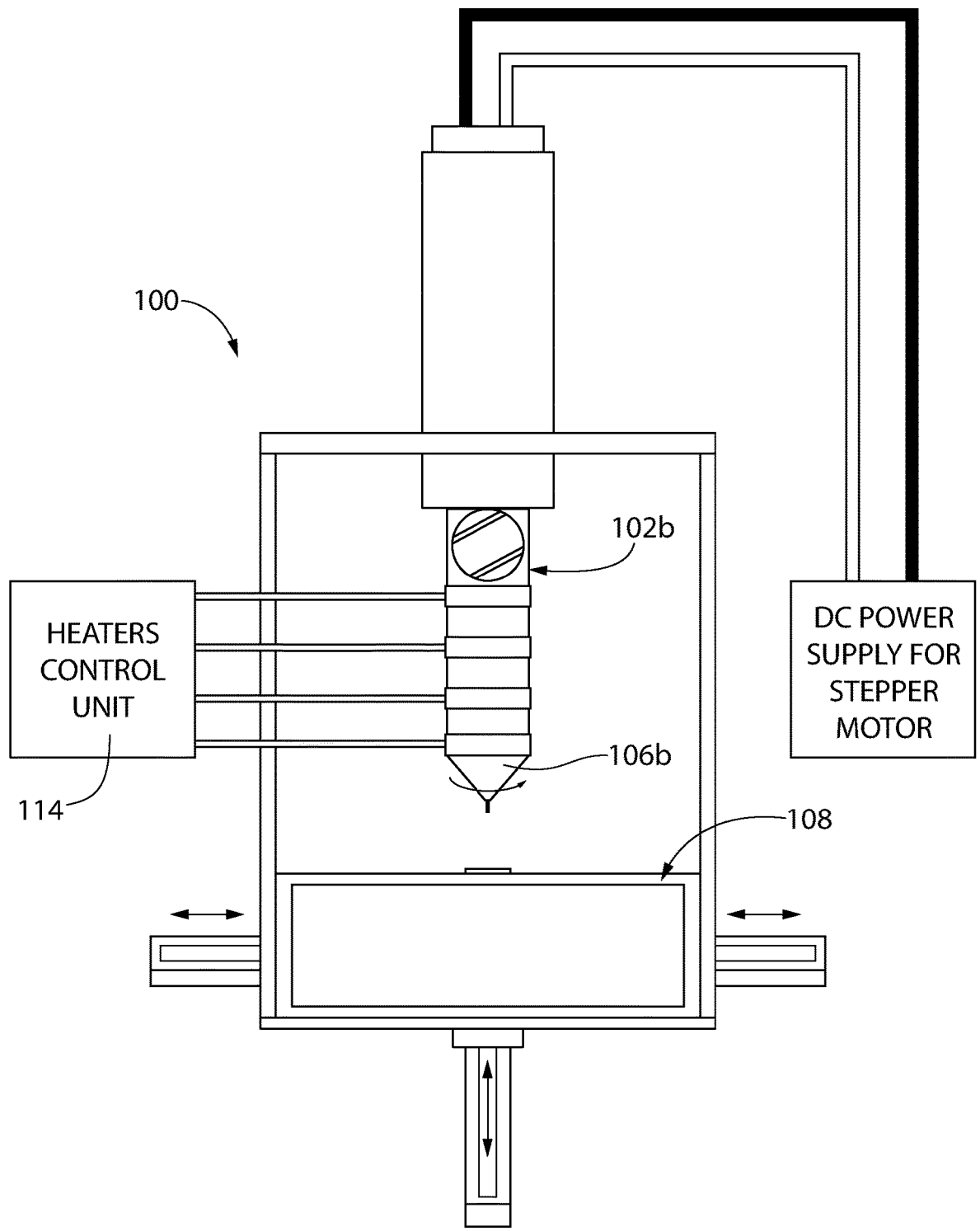
FIG. 8 is an elevational view of the system illustrated in FIG. 3B.

The temperature control mechanism 112 is configured to control the temporal shear rate and temperature history that the polymer/object material melt experiences in the printing head device and the ambient or bed temperature to proactively optimize the polymer molecular orientations and crystallinity that evolve during the process of the present invention and are frozen into the final printed object. Since ambient temperature plays a significant role in determining the frozen or locked-in final products properties, the system of the present invention may include a temperature controlled bed 160 (FIG. 7) that can tune the temperature of the build stage 108 rapidly. Heating fans can blow hot air toward the printed parts at adjustable temperatures while the cooling fans can help lower the ambient temperature as needed. Unlike regular heated beds where the bottom of the parts get exposed to higher temperature than the top due to its contact with the surface, this temperature controlled bed can help have the parts get exposed to an equal amount of heat. Using this controllable bed 160 and ambient temperature along with tuning shear rate during the printing process can create objects with different properties even along one particular part by adjusting the core and the surface properties.

The temperature control mechanism 112 may include a heating or cooling device or devices for controlling the temperature of either a build surface of the build stage 108 or the ambient environment around the system and object material, in order to control the solidification of the object material into the printed object and lock in the customized material properties. For example, the heating or cooling devices may be incorporated into the build stage 108 or provided around the build stage. In one embodiment, the bed 160 (FIG. 7) with a number of blowers 162 may be associated with the build stage 108 to blow either hot or cold air toward or onto the object being printed.

The precision micro-extrusion system 100b shown in FIG. 3B is similar to system 100a, except it uses a heated extrusion screw 122 and barrel mechanism 124 to melt, mix, and drive the object material out through the nozzle 106b to be printed into the object. As such, the feeder 102b of the micro extrusion system 100b preferably receives the object material in the form of pellets 12b rather than pre-drawn filament from a spool.

Figures 5A, 5B, 5C:
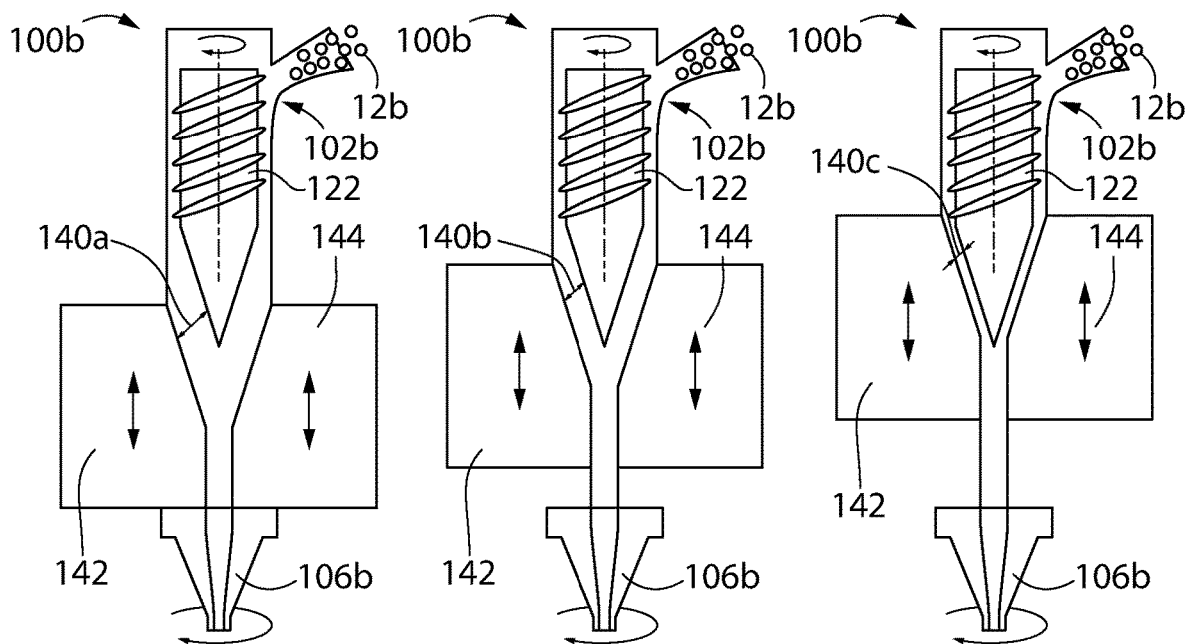
FIGS. 5A through 5F are elevational views of the system illustrated in FIG. 3B, showing a molecular orientation mechanism according to an exemplary embodiment of the present invention.
Figures 5D, 5E, 5F:
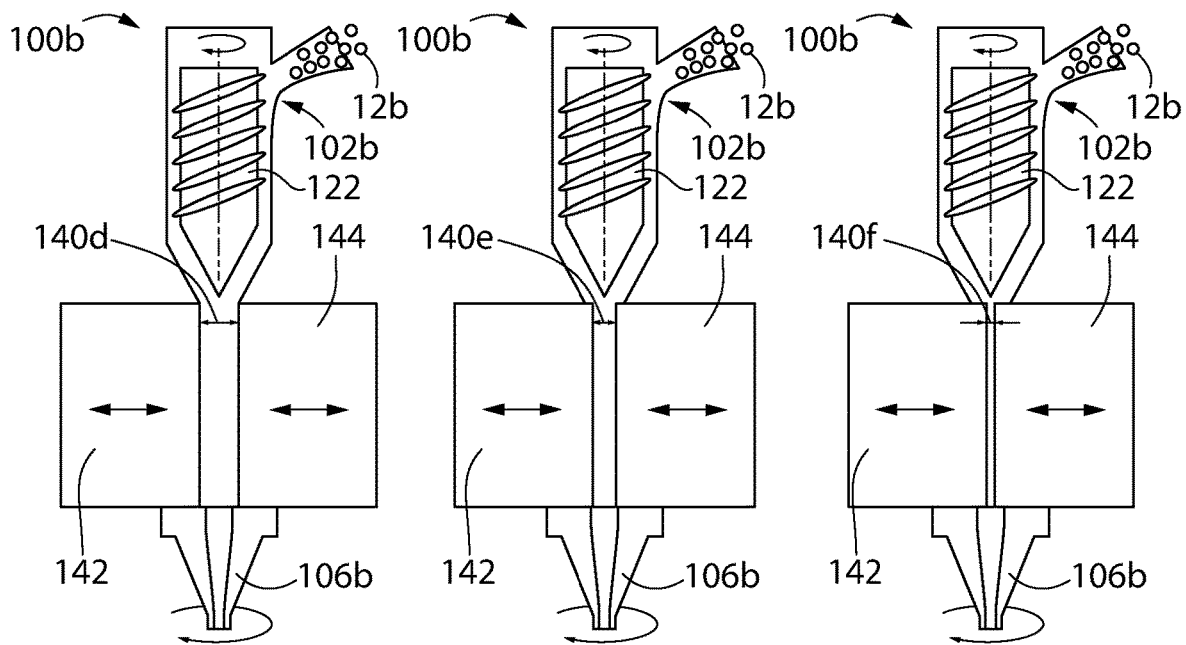

The shear rate tuning mechanism 110 for the micro-precision extrusion system 100b is similar to that of the fused deposition system 100a, except that the adjustable rotation device is the extrusion screw 122 and the adjustable rotation rate thereof which may be controlled to increase or decrease the flow speed at which the object material is delivered through the system; and moveable segments 142 and 144 of the system 100b may be moved in at least two directions, i.e. longitudinally (FIGS. 5A-5C) or laterally (FIGS. 5D-5F), to define adjustable channels 140a-140f, in order to control axial molecular orientation development. Like the fused deposition system 100a, the rate of rotation of rotatable nozzle 106b of the system 100b may be control and the temporally adjusted (via control 114) to impart circumferential molecular orientation on the object material. As seen in FIGS. 5A-5C, the size of the gap or cross-sectional dimension of the channels 140a, 140b, and 140c decreases as the moveable segments 142 and 144 are moved longitudinally away from the nozzle 106b, thereby increasing the shear rate imposed on the object material from channel 140a to channel 140c. As seen in FIGS. 5D-5F, the size of the gap or cross-sectional dimension of the channels 140d, 140e, and 140f decreases as the moveable segments 142 and 144 are moved laterally toward one another, thereby increasing the shear rate imposed on the object material from channel 140d to channel 140f This allows for precise control over the duration and the amount of shear that is applied to the polymer.

The nozzles 106a, 106, which can rotate at varying set of speeds allows for added variation to the shear rate imposed on the object material, thereby controlling rheological properties, temporal pressures, temperatures, and strain rates imposed on the object material, that in turn directly impact molecular orientation evolution, relaxation dynamics, crystallization kinetics during the additive manufacturing process of the present invention. It will also allow for a control over filler orientation to control short fiber orientation by adjusting the nozzle rotational speed relative to the extrusion speed or flow rate. This also allows for controlling the melt viscosity, such that the diameter of the deposited strand of the object material can be set, regardless of the speed of the x-y plane speed of the deposition.

The temperature control mechanism 112 for the micro-precision extrusion system 100b may be configured such that as the object material progresses toward higher melting point polymers, controlled cooling in the nozzle exit region of the nozzle 106b may be provided to both lock in the achieved molecular orientation states and assure proper geometrical printing. Ambient temperature control, in accordance with the present invention, uses heating and cooling fans in order to tune the temperature rapidly to freeze the molecular orientation that were developed by shear and to precisely control crystallinity all over the 3D printed product.

The system 100 and method of the present invention, using the shear rate tuning and temperature control mechanisms 110 and 112, preferably provides the precise and temporal shear rate and temperature control to proactively impact the localized evolution and final state of molecular orientation throughout the resultant additively manufactured object. And the locally tunable final molecular orientation state of the object will also lead to corresponding locally tunable product performance properties. The system 100 and method of the present invention, using the shear rate tuning and temperature control mechanisms 110 and 112, may also provide the precise and temporal shear rate and temperature control to proactively impact the localized evolution and final state of molecular orientation and crystallinity throughout the resultant additively manufactured product. And the locally tunable final molecular orientation and crystallinity states will also lead to corresponding locally tunable product performance properties. The system 100 and method of the present invention, using the shear rate tuning and temperature control mechanisms 110 and 112, preferably provides of the precise and temporal shear rate and temperature control is to proactively impact the localized evolution and final state of filler distribution and alignment throughout the resultant additively manufactured product. And, the locally tunable distribution and alignment of filler components will also lead to corresponding locally tunable product performance properties.

Figure 9:
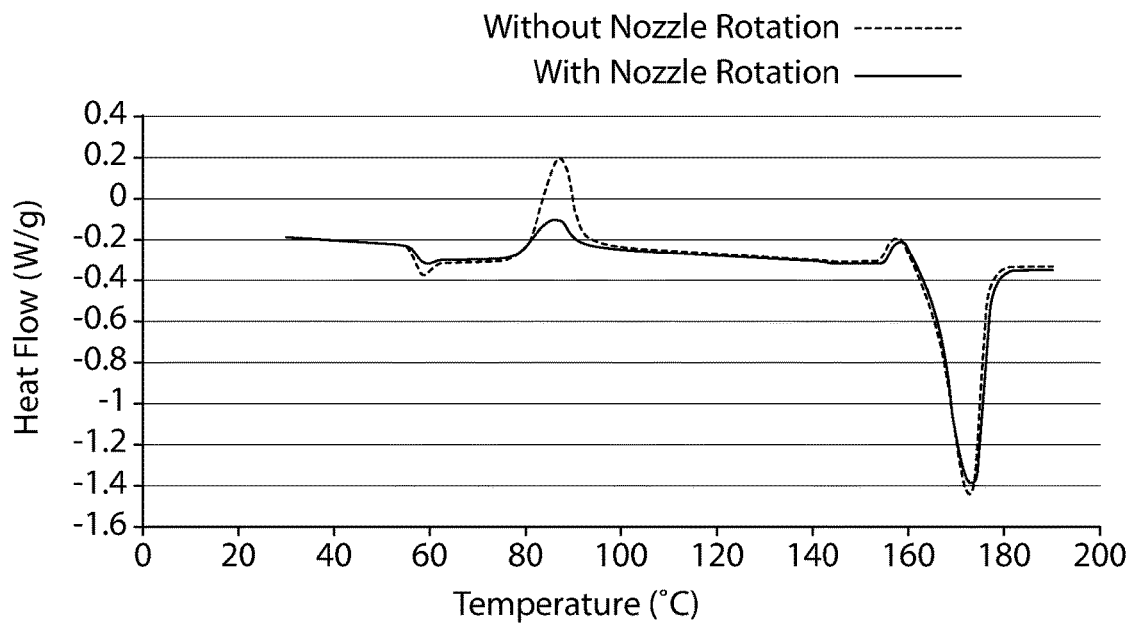
FIG. 9 is a graph showing a DSC analysis of an object material printed with and without incorporating a molecular orientation mechanism of the present invention.

In one example of the use of the present invention, test results of extruded polylactid acid (PLA) strands, a biodegradable and biocompatible polymer, commonly used in biomedical scaffolds and sutures, using differential scanning calorimetry (DSC) and X-Ray diffraction prove that the thermal properties are influenced even by small changes in processing parameters. A sample comparative result is shown in the graph of FIG. 9, which is a DSC analysis for the PLA object material with and without incorporating the nozzle rotation. The result reveals evident differences in thermal properties of the extruded material. The data reveals that crystallinity can be tuned by applying different amount of shear by rotating the nozzle 106a, 106b. It is apparent that higher shear rate caused the exothermic peak to be lower and it also caused the endothermic peak to shift slightly to the higher temperature. Crystallinity increased by 12% when higher shear rate was introduced by rotating the nozzle 106a, 106b. As a higher ordered crystal structure is expected to melt at higher temperatures, this observation, in addition to the lower cold crystallization exotherm reveal distinct material properties and crystallization kinetics of the same material processed under different conditions on the system 100. These results were achieved with the nozzle rotating at just 200 RPM. Higher RPM will result in higher shear rate and therefore will yield in more enhancement of the crystallization process.

Figure 10:
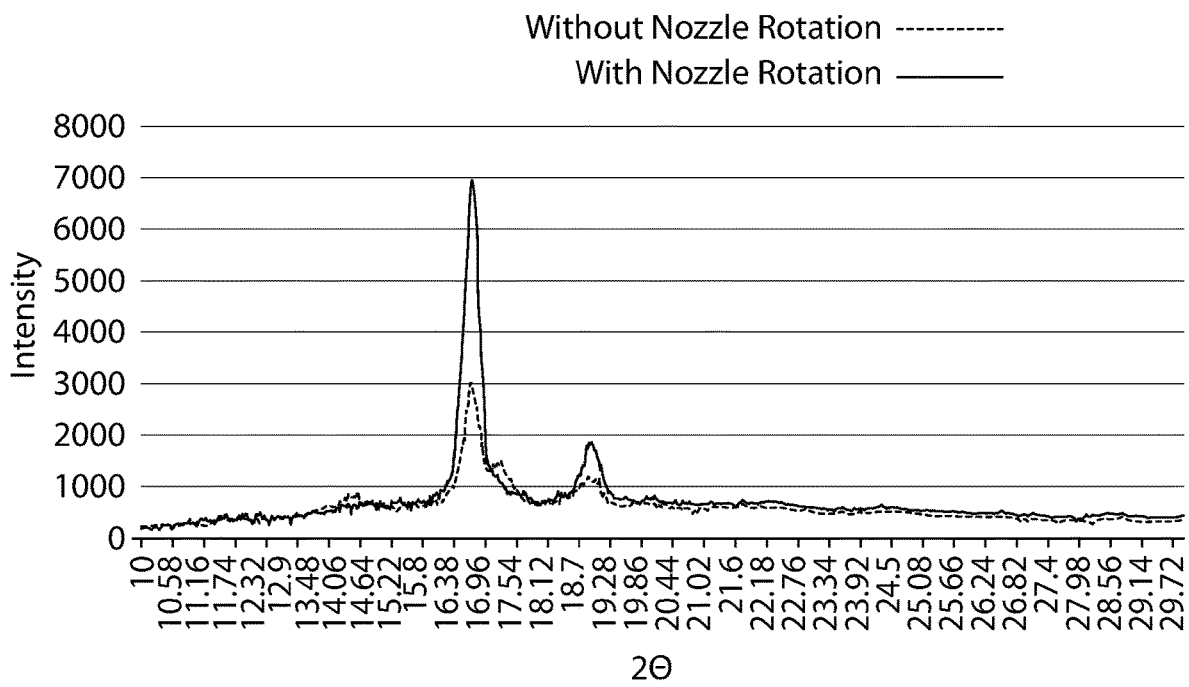
FIG. 10 is a graph showing a XRD analysis of an object material printed with and without incorporating the molecular orientation mechanism of the present invention.

FIG. 10 shows the WAXD profiles for two samples that were 3D printed under different shear conditions in accordance with the present invention. In particular, FIG. 10 shows an XRD analysis for the PLA object material with and without incorporating the nozzle rotation. The results show sharper peaks and higher intensities when higher shear rate is applied. The most intense peaks are observed at $2\theta=16.5°$ n which can be attributed to the (110) and/or (200) planes. It is clear that higher shear rate that was applied to the polymer object material with the nozzle rotation caused the peak to be sharper compared to the sample that was 3D printed at lower shear rate (without nozzle rotation). This shows that higher shear rate cause an improvement of peak intensity. The other strong reflections are of the (203) and/or (113) planes. Also, the reflection at (010) appear to be weaker with nozzle rotation.

Figure 11:
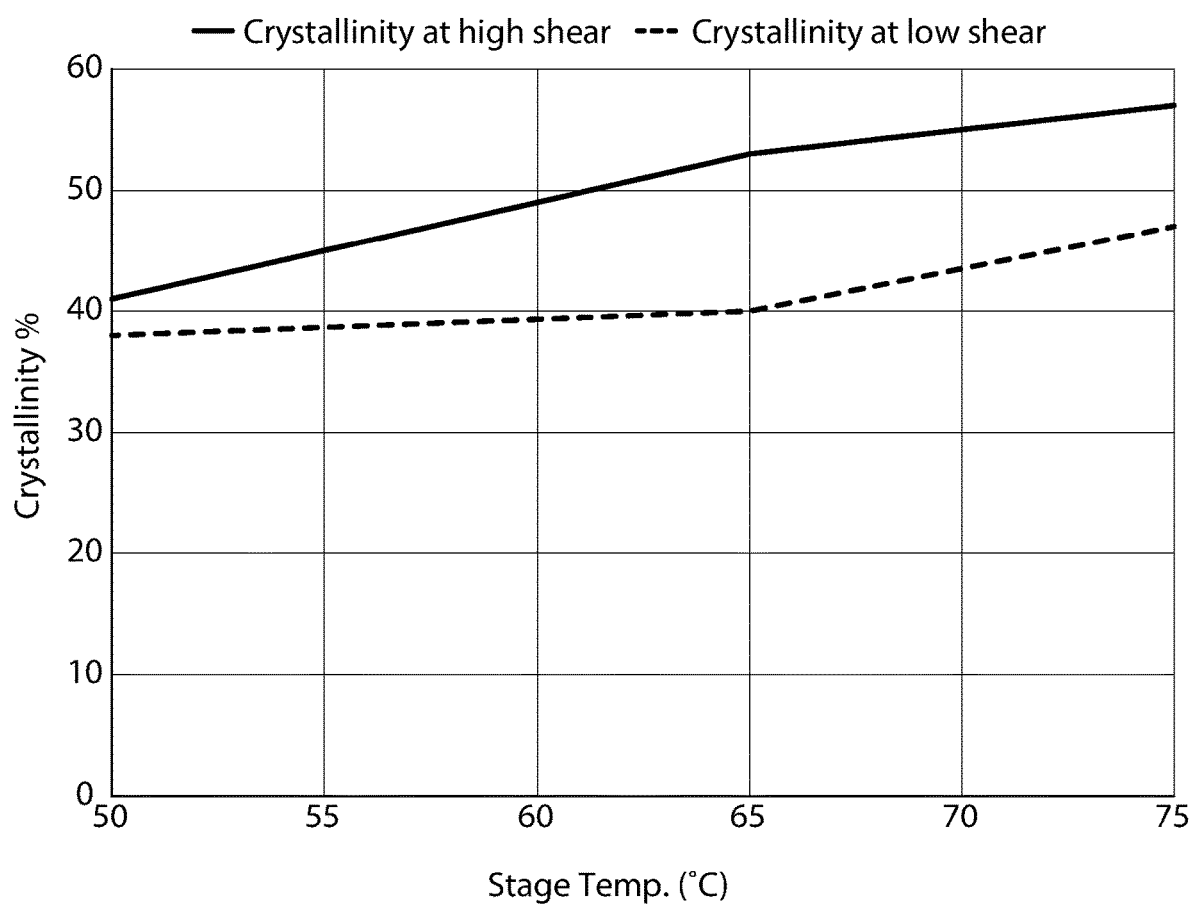
FIG. 11 is a graph showing a crystallization property analysis of an object material printed with and without a molecular orientation mechanism and an adjustable temperature mechanism of the present invention.

FIG. 11 shows the test results of the influence of bed temperature and shear rate on crystallization behavior of the object material, in accordance with the present invention. As the bed temperature increases from 18° C. to 85° C., the crystallinity increases from 10% to 53% in the case with no nozzle rotation while with nozzle rotation crystallinity grows from 3% to 55%. When a higher shear rate is applied to the polymer object material at a bed temperature around room temperature or lower than room temperature by cooling the bed, lower crystallinity of the object material was achieved. Due to the shearing of the object material and then cooling the object material fast below the glass transition temperature, crystals are not allowed to grow. As temperature increases above room temperature, the effect of shear rate on crystallinity of the object material becomes more obvious, especially around the temperature of 55° C. to 75° C. where the parts of the object that were printed with higher shear rate achieved higher crystallinity up to 12% compared to those printed without nozzle rotation.

The system of the present invention may be used in several applications, such as is in the production of tissue scaffolds for regenerative medicine or the production of implantable drug delivery devices and prostheses or biomaterial scaffolds for cardiac tissue that would foster cell development and subsequent optimal biodegradation capability. And polymer tissue scaffolds printed by the system of the present invention may be produced with a supportive research component involving cardiomyocyte cell response and scaffold biodegradation included to provide critical feedback to material processing technique development and optimization. Moreover, the system of the present invention can build customizable implantable bones with different crystallinity levels, where the low crystallinity part can be attached to the cartilages and the high crystallinity part can be attached to the bones. Other applications of the present invention include fabrication of circuit boards in the microelectronics industry in which molecular orientation may be used to direct current flow in a specific direction. The system of the present invention may also be used for manufacturers that require highly customizable polymer parts.

While particular embodiments have been chosen to illustrate the invention, it will be understood by those skilled in the art that various changes and modifications can be made therein without departing from the scope of the invention as defined in the appended claims.

What is claimed is:

1. An additive manufacturing system for printing a 3D object, comprising:
    a feeder configured to accept and feed an object material through the additive manufacturing system, the object material being a material of the 3D object to be printed;
    a heater or heaters in communication with the feeder, the heaters being configured to receive the object material from the feeder for controlled heating of the object material as the object material passes through the additive manufacturing system;
    a nozzle configured to receive the object material from the heaters and through which the object material is extruded for depositing the object material onto a build stage;
    a shear rate tuning mechanism being configured for controlling a shear rate imposed on the object material in one or more directions as the object material passes through the additive manufacturing system;
    wherein the shear rate tuning mechanism includes an adjustable channel in communication with the nozzle, the channel defines a gap through which the object material flows, and the control or controls selects the size of the gap in order to tune the shear rate imposed on the object material as it passes through the channel;
    a temperature control mechanism for tuning the melt temperature and solidification of the object material throughout the additive manufacturing system; and
    a control or controls for operating the shear rate tuning mechanism and the temperature control mechanism in order to impact the localized evolution and final state of molecular orientation throughout the printed 3D object.

2. The additive manufacturing system according to claim 1, wherein the control or controls are configured to operate the shear rate tuning mechanism and the temperature control mechanism in order to impact the localized evolution and final state of the crystallinity throughout the printed 3D object.

3. The additive manufacturing system according to claim 1, wherein the object material includes filler components and the control or controls are configured to operate the shear rate tuning mechanism and the temperature control mechanism in order to impact the localized evolution and final state of filler distribution and alignment throughout the printed 3D object.

4. The additive manufacturing system according to claim 1, wherein the temperature control mechanism includes a heating or cooling device to control the temperature of either a build surface of the build stage or an ambient environment around the object material.

5. The additive manufacturing system according to claim 1, wherein the adjustable channel includes movable segments movable by the control or controls to the selected gap size.

6. The additive manufacturing system according to claim 5, wherein the movable segments are movable laterally toward and away from each other to decrease or increase, respectively, a cross-sectional dimension of the channel.

7. The additive manufacturing system according to claim 5, wherein the movable segments are movable longitudinally toward and away from the nozzle to increase or decrease, respectively, a cross-sectional dimension of the channel.

8. The additive manufacturing system according to claim 1, wherein the shear rate tuning mechanism further includes an adjustable rotation device of the feeder, and the control or controls selects a rate of rotation of the adjustable rotation device to increase or decrease the speed of flow of the object material from the feeder and through the additive manufacturing system, thereby tuning the shear rate to which the object material is exposed.

9. The additive manufacturing system according to claim 1, wherein the build stage is movable and the control or controls are configured to move the build stage in concert with the selected rate of rotation.

10. The additive manufacturing system according to claim 8, wherein the adjustable rotation device includes a set of rotating rollers between which the object material is fed to the heater or heaters.

11. The additive manufacturing system according to claim 1, wherein the control or controls adjusts the rate of rotation of the set of rotating rollers to increase or decrease the flow speed of the object material and the shear rate imposed on the object material.

12. The additive manufacturing system according to claim 8, wherein the adjustable rotation device includes a rotatable screw extruder that feeds the object material to the heater and the nozzle.

13. The additive manufacturing system according to claim 1, wherein the control or controls adjusts the rate of rotation of the rotatable screw extruder to increase or decrease the flow speed of the object material and the shear rate imposed on the object material.

14. The additive manufacturing system according to claim 1, wherein the shear rate tuning mechanism includes the nozzle which rotates about a longitudinal axis thereof to impose a controlled amount of shear in a circumferential direction on the object material.

15. The additive manufacturing system according to claim 1, wherein the control or controls selects a rate of rotation of a rotatable nozzle to tune the shear rate imposed on the object material.

16. The additive manufacturing system according to claim 1, wherein the object material is a polymer, polymer composite, or a polymer with filler.

17. The additive manufacturing system according to claim 1, wherein the temperature control mechanism includes a temperature bed associated with the build stage.

18. The additive manufacturing system of claim 17, wherein the temperature bed includes one or more blowers for heating or cooling the object material extruded from the nozzle on the build stage.

* * * * *